US 7,468,706 B2

United States Patent
Andersson et al.

(10) Patent No.: US 7,468,706 B2
(45) Date of Patent: Dec. 23, 2008

(54) ANTENNA SYSTEM AND METHOD FOR MEASURING THE AZIMUTH AND ELEVATION ANGLES OF AN ACTIVE, SIGNAL SENDING RADIOSONDE

(75) Inventors: Henry Andersson, Espoo (FI); Pentti Karhunen, Vantaa (FI); Jarkko Korte, Espoo (FI); Juhana Jaatinen, Hyvinkää (FI)

(73) Assignee: Vaisala OYJ, Helsinki (FI)

( * ) Notice: Subject to any disclaimer, the term of this patent is extended or adjusted under 35 U.S.C. 154(b) by 508 days.

(21) Appl. No.: 10/538,851

(22) PCT Filed: Dec. 16, 2003

(86) PCT No.: PCT/FI03/00963

§ 371 (c)(1),
(2), (4) Date: Jun. 14, 2005

(87) PCT Pub. No.: WO2004/055939

PCT Pub. Date: Jul. 1, 2004

(65) Prior Publication Data

US 2006/0071866 A1 Apr. 6, 2006

(30) Foreign Application Priority Data

Dec. 16, 2002 (FI) ................................. 20022202

(51) Int. Cl.
*H01Q 3/00* (2006.01)
(52) U.S. Cl. .................................................. 343/757
(58) Field of Classification Search ............... 343/757, 343/758, 759, 763, 765
See application file for complete search history.

(56) References Cited

U.S. PATENT DOCUMENTS

| 5,053,784 A | 10/1991 | Hippeläinen |
| 5,245,348 A | 9/1993 | Nishikawa et al. |
| 5,486,835 A | 1/1996 | Hock |
| 5,543,811 A | 8/1996 | Chethik |

FOREIGN PATENT DOCUMENTS

FI  RU 2 195 056 C2  12/2002

OTHER PUBLICATIONS

Yingbo Hua et al., IEEE Transactions on Antennas and Propagation, vol. 39, No. 2 Feb. 1991, pp. 143-146.

*Primary Examiner*—Trinh V Dinh
*Assistant Examiner*—Dieu Hien T Duong
(74) *Attorney, Agent, or Firm*—Birch, Stewart, Kolasch & Birch, LLP

(57) ABSTRACT

An antenna system and method for measuring azimuth and elevation angles of an active, signal sending radiosonde. The system includes a first passive antenna group having at least two antenna arrays, the direction pattern of which is wide at least in elevation plane for measuring azimuth angle based on the phase differences between the antenna arrays, a second passive antenna group having at least two antenna arrays, the direction pattern of which is wide at least in elevation plane for measuring the elevation angle based on the phase differences between the antenna arrays and the rotational position of the antenna field, and at least one third antenna having high gain for receiving the telemetry signal, the direction pattern of which element is narrow in azimuth plane and wide in elevation plane. The first and second antenna groups form a solid antenna field which is fixedly tilted in a predetermined elevation position.

24 Claims, 5 Drawing Sheets

ANTENNA SYSTEM AND METHOD FOR MEASURING THE AZIMUTH AND ELEVATION ANGLES OF AN ACTIVE, SIGNAL SENDING RADIOSONDE

CROSS-REFERENCE TO RELATED APPLICATION

The present application is a National Stage application of PCT/FI03/00963, filed Dec. 16, 2003, which claims priority to Finnish Application No. 20022202 filed Dec. 16, 2002, the entire contents of which are hereby incorporated by reference.

BACKGROUND OF THE INVENTION

1. Field of the Invention

The present invention relates to an antenna structure and to a method for measuring the azimuth and elevation of an active, signal sending radiosonde.

The present invention is related to atmospheric sounding systems, in which the properties of the atmosphere are measured in-situ by independent, self powered active components typically called radiosondes including a radio transmitter. Typical features for this technique are inactive (non-sending) receiving antennas and the fact that the measuring device (radiosonde) is either lifted or dropped through the space to be measured.

Parameters measured in-situ by sensors of the radiosonde, such as air pressure, temperature and relative humidity, are transmitted through a telemetry link to a receiving station. Other parameters of interest are wind speed and wind direction that can be measured by using navigation aid networks such as GPS or Loran-C, by a primary or secondary radar, or by a passive (non-sending) and independent (no navigation aid networks used) radiotheodolite. Height of the radiosonde can be calculated from the air pressure, temperature and humidity data.

The object of the invention is to determine the azimuth and elevation angles of an active radiosonde in a three dimensional space with a passive (non-sending) antenna structure independent of navigation aid networks. A typical application of the invention is to locate a radiosonde launched into the atmosphere with the help of a balloon filled with hydrogen or helium. Radiosonde azimuth and elevation angles are determined from the received radiosonde signal.

Wind speed and direction can be calculated from consecutive azimuth and elevation angles and height of the radiosonde.

2. Description of Background Art

Prior solutions in the 1680 MHz meteorological frequency band track the radiosonde mechanically both in the azimuth and elevation directions. The disadvantage of this solution is the complicated and expensive mechanical receiving antenna structure.

Another disadvantage of the prior solutions is the disability to attenuate ground reflections enough when the radiosonde signal is received from a low elevation angle.

SUMMARY AND OBJECTS OF THE INVENTION

It is an object of the present invention to overcome the problems of the prior solutions and to provide an entirely novel type of antenna structure and a method for determining the azimuth and elevation angles of a radiosonde.

The goal of the invention is achieved by a fixedly backwards tilted antenna field, in which the antenna elements are assembled on an antenna frame. In one typical embodiment the antenna field is rotated around vertical axis approximately to the direction of the radiosonde while the elevation angle remains essentially constant.

In another embodiment of the invention there are at least three such fixedly tilted antenna fields that point to different fixed azimuth directions. This solution has no moving parts.

The invention offers significant benefits.

By attenuating the ground reflection the azimuth and elevation angles of the radiosonde can be measured more precisely especially when the radiosonde is in a low elevation angle.

The mechanics of the antenna structure can be simplified and manufactured at a lower cost. Furthermore the reliability of the system is increased as there are less moving parts.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

In the following, the invention will be examined in greater detail with the help of exemplary embodiments by making reference to the appended drawings in which

FIG. 1b shows a simplified version of the embodiment of FIG. 1a.

DETAILED DESCRIPTION OF THE PREFERRED EMBODIMENTS

Figure 1A:
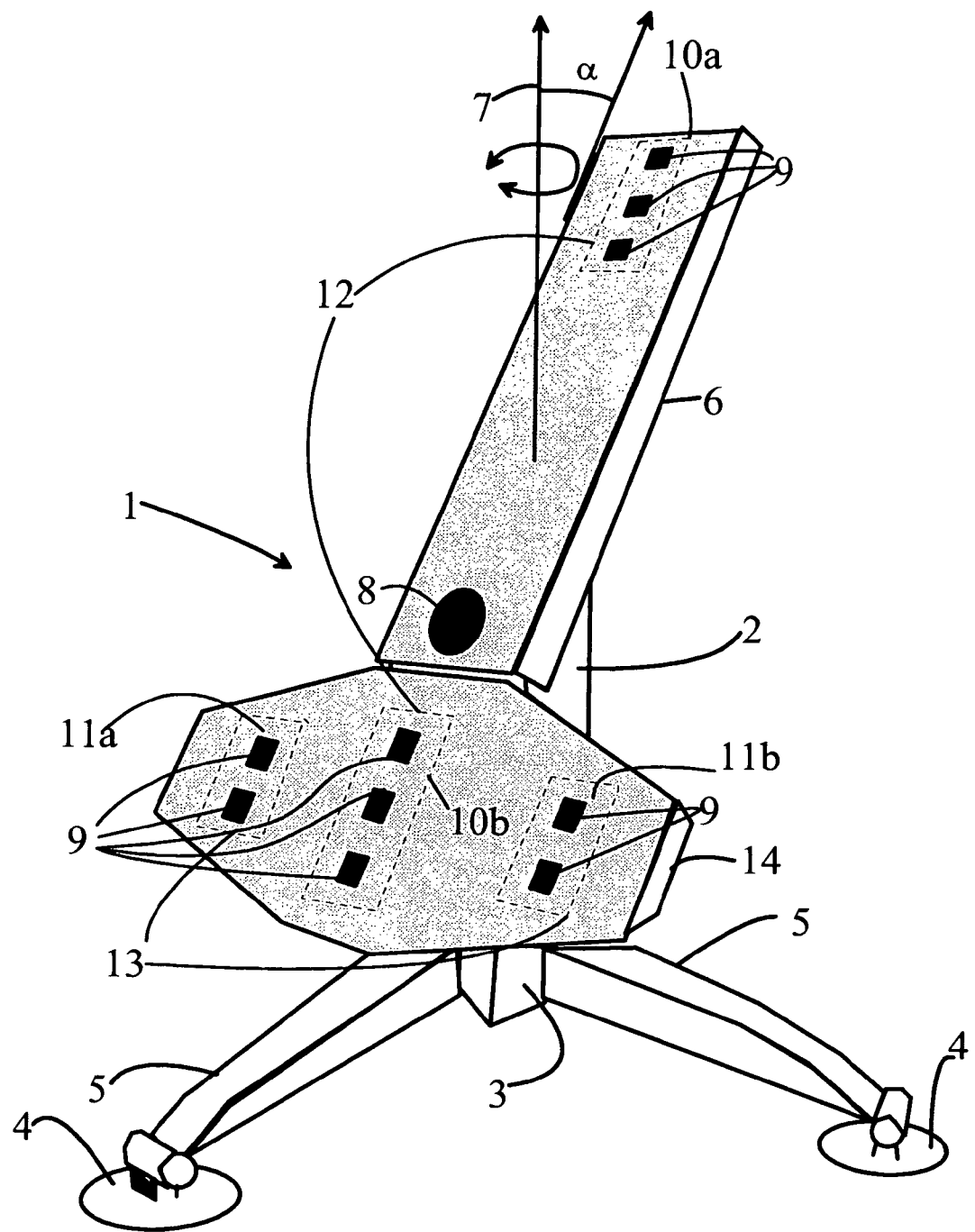
FIG. 1a shows in a perspective view a rotatable antenna structure in accordance with the invention.
Figure 1B:
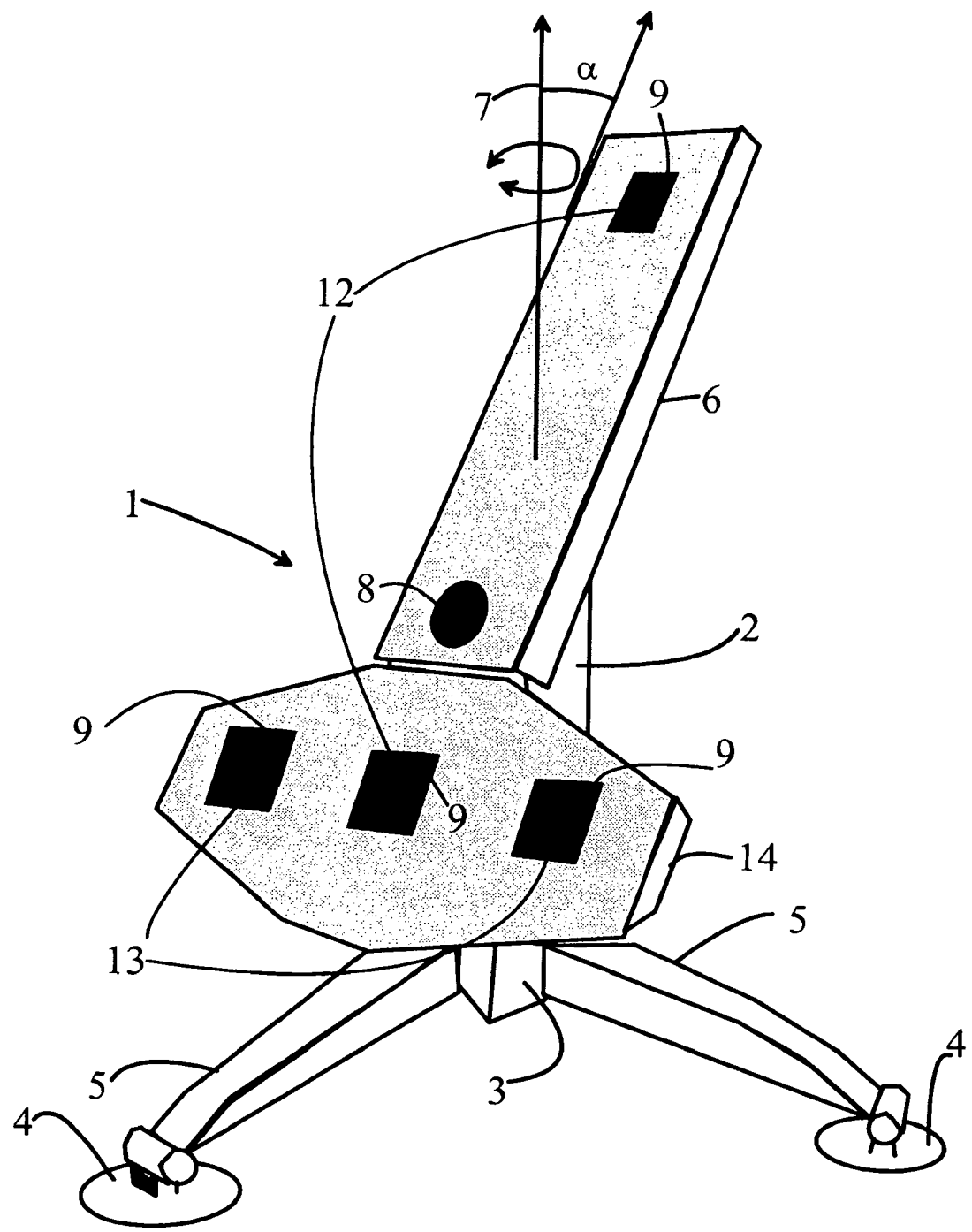

In accordance with FIGS. 1a and 1b, the essentially planar antenna field 1 comprises a vertical antenna group 12 and a horizontal antenna group 13. The vertical antenna group 12 comprises at least two antenna arrays 10a and 10b positioned above each other. In this solution each array comprises three antenna elements 9. The direction pattern of these arrays 10a and 10b is wide in elevation plane.

The vertical antenna group 10a and 10b is used for determining the elevation angle of the radiosonde based on the phase differences of the received radiosonde signal between the antenna arrays 10a, 10b.

Respectively horizontal antenna group 13 comprises two horizontal antenna arrays 11a and 11b positioned at least essentially symmetrically around the vertical center line of the antenna field 1. In this solution each array comprises two or more antenna elements 9. The direction pattern of these arrays 11a and 11b is also wide in elevation plane.

The azimuth angle of the radiosonde is determined with arrays 11a and 11b based on the phase differences between the antenna arrays 11a, 11b and the rotational position of the antenna field 1.

One preferable embodiment 1 of the invention includes only one rotatable support frame divided in upper 6 and lower parts 14. The antenna field 1 with its frame 2 is mounted on a stationary tripod 3 having circular support plates 4 at the end of its legs 5. An independent antenna 8 is for radiosonde telemetry. The antenna frame is rotatable around the vertical axis 7 for directing the antenna field 1 approximately to the direction of the radiosonde. The azimuth angle is measured with the horizontal antenna group 13 on the lower part 14 of the frame and elevation angle with help of the vertical antenna group 12 positioned on the upper and lower parts 6 and 14 of the frame. A simplified version of the antenna groups required for the angle measurement is presented is the FIG. 1b. The tilting angle α is typically 30°. The term "fixed tilting" or "fixed tilting angle" in this context means also solutions, where a small vibrational deviation of the tilting angle is allowed for example due to the wind.

Due to the antenna group 13 for azimuth measurement, the antenna field 1 forms an inverted T- or L-shape. With this solution a low center of gravity and wind load can be achieved. Obviously, the azimuth antenna group 13 can be positioned also in the upper part 6 or a center of the antenna field 1 within the scope of the inventive idea, whereby a T-, inverted L- or plus (+) shape is formed. The invention does not limit the azimuth and elevation antenna groups to be perpendicular to each other or the ground, thereby allowing, for instance, also an X-shape antenna field.

Radiosonde telemetry reception is independent of azimuth and elevation measurements. The telemetry signal is received by a separate high gain directional antenna 8. The direction pattern of the antenna 8 is typically narrow in azimuth plane and wide in elevation plane.

FIG. 1b represents a simplified version of the antenna structure of FIG. 1a. In this version each antenna array is replaced by single antenna elements 9.

Figure 2:
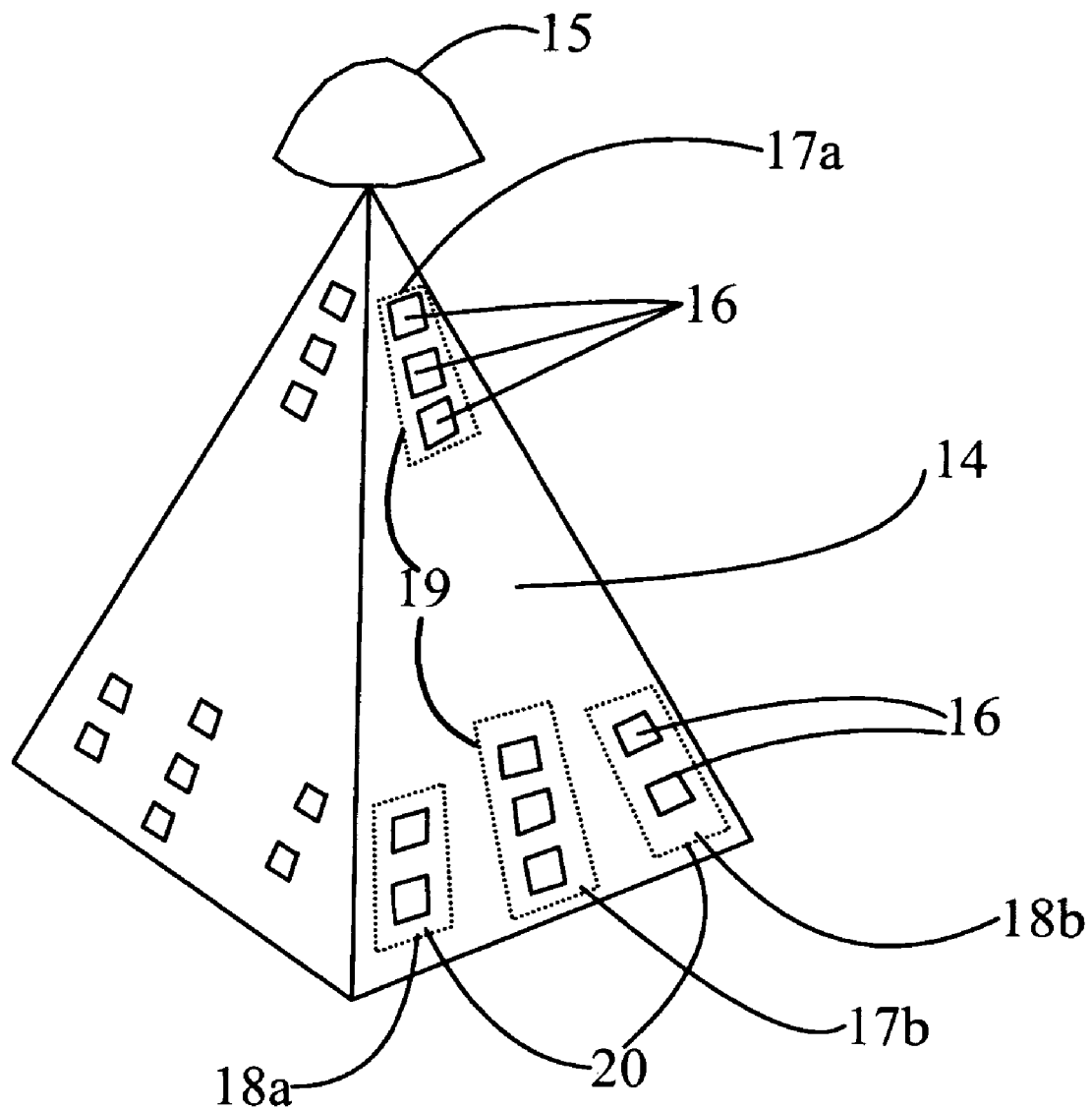
FIG. 2 shows in a perspective view a stationary antenna structure in accordance with the second embodiment of the invention.

FIG. 2 represents another embodiment of the invention in a form of a fixed pyramid shaped antenna with four tilted antenna fields 14. The azimuth angle is measured with horizontal antenna group 20 comprising two antenna arrays 18a and 18b at the bottom of the pyramid. Arrays include two or more antenna elements 16. Elevation angle is measured with vertical antenna group 19 comprising two vertically positioned antenna arrays 17a and 17b in the upper and lower parts of the pyramid. The telemetry signal is received by a separate directional antenna 15 positioned on the top of the pyramid.

In both of the before described solutions the azimuth angle is determined from the measured phase difference of at least two antenna elements or arrays in the horizontal direction (horizontal groups 13 or 20), and from the direction of the antenna field 14.

The elevation angle is determined from the measured phase difference of at least two antenna elements or arrays essentially in the vertical direction (vertical groups 12 or 19).

Figure 3:
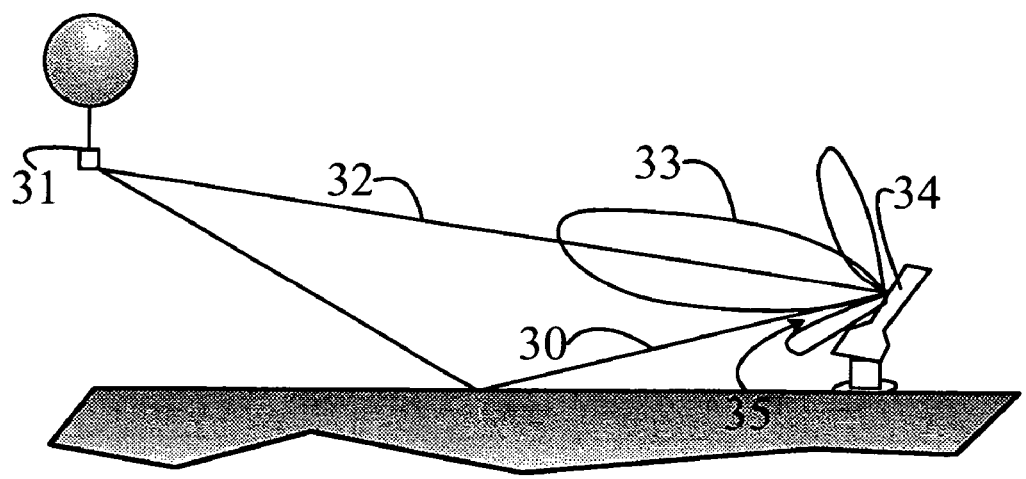
FIG. 3 shows schematically a balloon borne radiosonde, direct signal, ground reflection, rotatable antenna structure and a typical radiation pattern with a gain pattern minimum (null) in the direction of the ground reflection.

In accordance with FIG. 3, the purpose of the antenna system 34 is to obtain a direct radio signal 32 from the radiosonde 31. When the radiosonde 31 is in a low elevation angle, ground reflection 30 coming from the (negative) mirror angle has been a major factor degrading the performance of prior solutions. The present invention decreases this problem by aligning a gain pattern minimum 35 (null) of the radiation pattern 33 to the direction of the ground reflection 30. The direction is typically determined experimentally for different elevation angles by aligning the main beam by phased array techniques such that the ground reflection is minimized.

Figure 4:
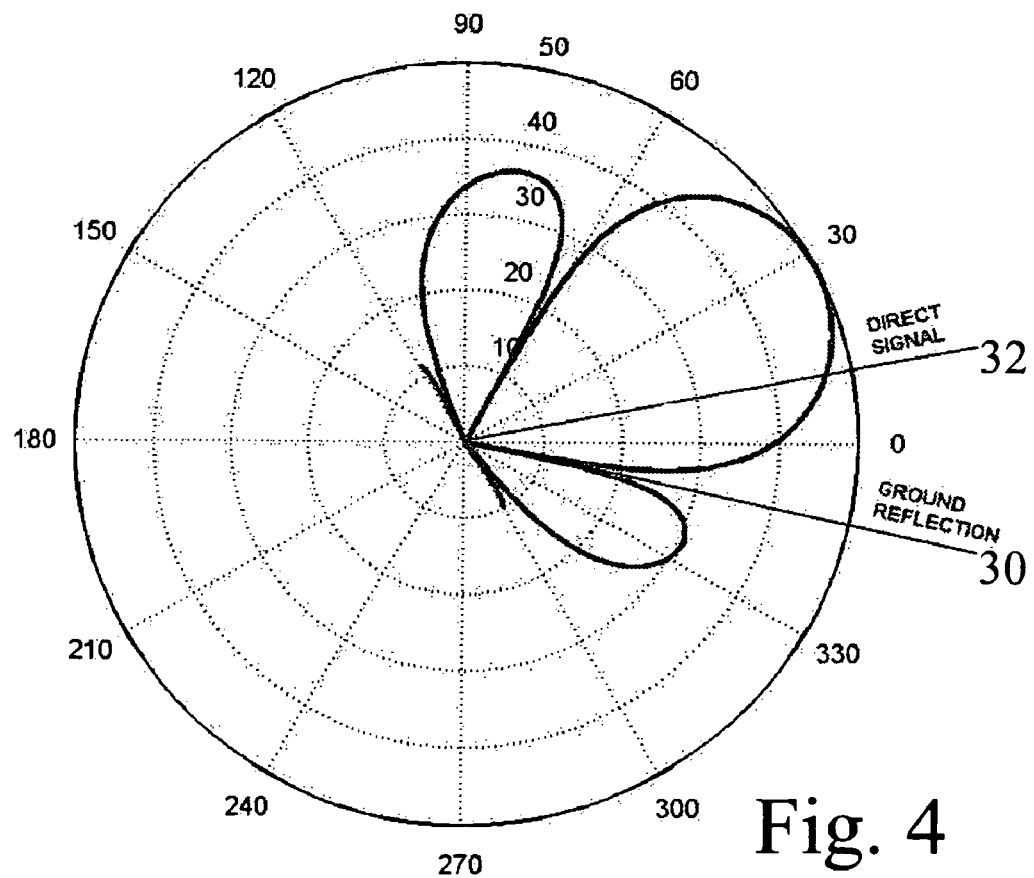
FIG. 4 shows a polar-plot of a typical radiation pattern for a two-element antenna array with a gain pattern minimum (null) in the direction of the ground reflection.

In accordance with FIG. 4, the gain pattern minimum (null) is formed by an antenna array (10a, 10b, 11a, 11b, or 17a, 17b, 18a, 18b) which consists of at least two antenna elements (9 or 16). Gain pattern minimum (null) 30 is directed by modifying the signal phase and amplitude of each antenna element in the array (beamforming).

Figure 5:
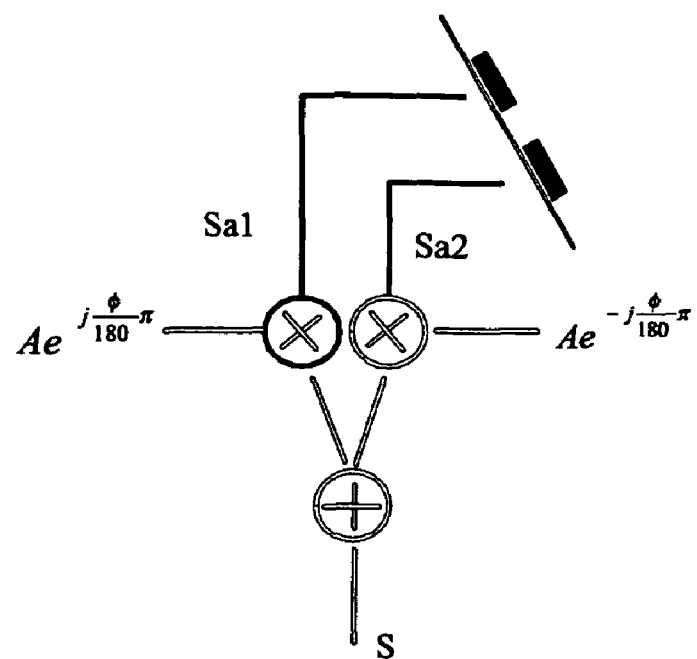
FIG. 5 shows schematically as a side view the phasing of a two-element antenna array.

According to FIG. 5, the sum of the modified signals represents the antenna array that can now be regarded as a single antenna element with a more suitable radiation pattern. A gain pattern minimum (null) is formed separately for each of the antenna arrays in the horizontal and vertical groups (12, 13 or 19, 20).

$$s = s_{a1}Ae^{j\frac{\phi}{180}\pi} + s_{a2}Ae^{-j\frac{\phi}{180}\pi}, \text{ where } \phi \text{ is a phase shift}$$

Phase shift is designed experimentally for different elevation angles (radiation patterns). Antenna beam forming is explained in more detail e.g., in reference Robert J. Mailloux, Phased Array Antenna Handbook, Chapters 2 and 3, 1994 Artech House, Inc, ISBN 0-89006-502-0.

Figure 6:
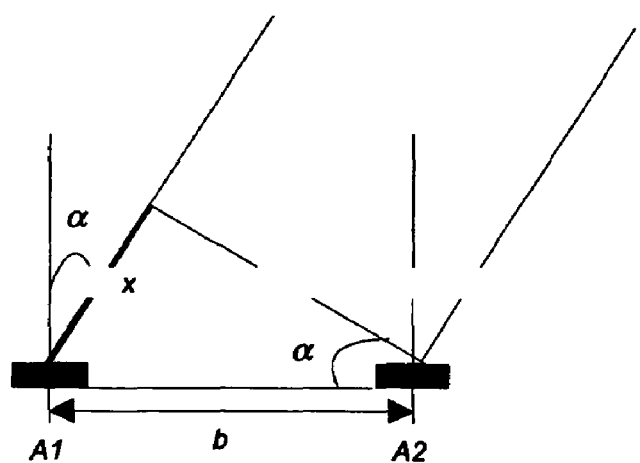
FIG. 6 shows that the angle of array can be measured by two identical antennas A1 and A 2.

In accordance with FIG. 6, the angle of arrival can be measured with two identical antennas A1 and A2 using interferometric principle explained in more detail e.g., in reference Englar, Mango, Roettcher, Watters, FINAL REPORT FOR THE MININTRACK TRACKING FUNCTION DESCRIPTION, Volume 1, March 1973, NASA-TMX-66213. If the base length (b) is less or equal than half of the wavelength (λ/2) the unambiguous angle of arrival (−90°<α<90°) can be measured. When the phase difference (φ) between antenna A1 and A2 has been measured (−180°<φ<180°), the direction of arrival (DOA) can be calculated as:

$$\alpha = \arcsin\left(\frac{x}{b}\right),$$
$$\text{where } x = \frac{c\phi}{f * 360°},$$

$c$ = speed of light and $f$ = signal frequency.

Instead of the planar antenna field 1 or 14 shown in FIGS. 1a, 1b and 2 the antenna field may be also convex, concave or for example stepped. In the rotatable embodiments of FIGS. 1a and 1b all the antennas, antenna arrays and antenna elements are positioned on this uniform rigid antenna field 1 regardless of the shape of the antenna field. In the embodiment of FIG. 2 the telemetry antenna 15 is not included to this antenna field 14.

In this application with wide beam is meant beam widths greater than 120°.

Respectively narrow beam means beam widths smaller than 30°.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

The invention claimed is:

1. An antenna system for measuring azimuth and elevation angles of an active, signal sending radiosonde, the antenna system comprising:
   a first passive antenna group comprising at least two antenna arrays, having a direction pattern that is wide at least in an elevation plane,
   the first passive antenna group being adapted to measure the azimuth angle of the radiosonde based on phase differences between the antenna arrays, and based on a direction of an antenna field,
   a second passive antenna group comprising at least two antenna arrays (10a, 10b) having a direction pattern that is wide at least in the elevation plane,
   the second passive antenna group being adapted to measure the elevation angle of the radiosonde based on phase differences between the antenna arrays, and
   at least one third antenna element having high gain adapted to receive a telemetry signal, a direction pattern of the at least one third antenna element being narrow in an azimuth plane and wide in the elevation plane,
   wherein
      the first and second antenna groups form the antenna field, and
      the antenna field is fixedly tilted in a predetermined elevation position,
   wherein each one of the at least two antenna arrays of the first passive antenna group is disposed directly facing each of right and left lateral sides of one of the at least two antenna arrays of the second passive antenna group.

2. The antenna system of claim 1, wherein the third antenna element belongs to the antenna field.

3. The antenna system of claim 1, wherein the antenna field is essentially planar.

4. The antenna system of claim 1, wherein the gain pattern minimum (null) of each of the antenna arrays is aligned to a direction of a ground reflection.

5. The antenna system according to claim 1, wherein the antenna system comprises means for rotating the antenna field around a vertical axis approximately to a direction of the radiosonde while the elevation angle remains essentially constant.

6. The antenna system according to claim 1, wherein reception of the telemetry signal from the radiosonde is independent of azimuth and elevation measurements.

7. The antenna system according to claim 1, wherein the antenna field is fixed in an elevation and an azimuth direction, and the antenna field comprises at least three antenna field pointing to different azimuth directions.

8. The antenna system of claim 7, wherein a gain pattern minimum (null) of each of the antenna arrays is aligned to a direction of a ground reflection.

9. The antenna system of claim 7, wherein reception of the telemetry signal from the radiosonde is independent of azimuth and elevation measurements.

10. The antenna system according to claim 1, wherein the antenna field is fixedly tilted backwards.

11. The antenna system according to claim 1, wherein the antenna field forms an inverted letter T.

12. The antenna system according to claim 1, wherein each of the at least two antenna arrays and the third antenna element is arranged in a straight line that is tilted with respect to a vertical axis.

13. The antenna system according to claim 1, wherein the antenna field (14) is fixed in an elevation and an azimuth direction, and the antenna field comprises four antenna fields pointing to different azimuth directions.

14. A method for measuring azimuth and elevation angles of an active, signal sending radiosonde, method comprising:
   providing a first passive antenna group comprising at least two antenna arrays having a direction pattern that is wide at least in an elevation plane,
   measuring the azimuth angle of the radiosonde based on phase differences of received radiosonde signals between the at least two antenna arrays and based on a direction of an antenna field,
   providing a second passive antenna group comprising at least two antenna arrays having a direction pattern that is wide at least in the elevation plane,
   measuring the elevation angle of the radiosonde based on phase differences of the received radiosonde signals between the at least two antenna arrays, and
   receiving a telemetry signal with at least one third antenna element having high gain, a direction pattern of the third element being narrow in an azimuth plane and wide in the elevation plane,
   wherein
      the first and second antenna groups form the antenna field, and
      the antenna field is fixedly tilted in a predetermined elevation position,
   wherein each one of the at least two antenna arrays of the first passive antenna group is disposed directly facing each of right and left lateral sides of one of the at least two antenna arrays of the second passive antenna group.

15. The method of claim 14, wherein the third antenna element belongs to the antenna field.

16. The method according to claim 14, further comprising:
   aligning a gain pattern minimum (null) of each of the antenna arrays to a direction of a ground reflection.

17. The method according to claim 14, further comprising:
   receiving the telemetry signal independently of azimuth and elevation measurements.

18. The method according to claim 14, further comprising:
   rotating the antenna system around a vertical axis approximately to a direction of the radiosonde while the elevation angle remains essentially constant.

19. The method according to claim 14, further comprising:
   fixedly tilting the antenna field backwards.

20. The method according to claim 14, further comprising:
   fixing the antenna field in an elevation and an azimuth direction, wherein the antenna field comprises at least three antenna fields pointing to different azimuth directions.

21. The method according to claim 20, further comprising:
   aligning a gain pattern minimum (null) of each of the antenna arrays to a direction of a ground reflection.

22. The method according to claim 20, further comprising:
   receiving the telemetry signal independently of azimuth and elevation measurements.

23. The method of claim 14, wherein each of the at least two antenna arrays and the third antenna element is arranged in a straight line that is tiled with respect to a vertical axis.

24. The method of claim 14, wherein the antenna field is fixed in an elevation and an azimuth direction, and the antenna field comprises four antenna fields pointing to different azimuth directions.

* * * * *